United States Patent [19]

Matsuda et al.

[11] Patent Number: 4,705,304
[45] Date of Patent: Nov. 10, 1987

[54] HOSE COUPLER FOR SPIRAL WIRE REINFORCED HOSES

[76] Inventors: Tatsuya Matsuda, 2217, Uwano, Nyuzen-machi, Shimoniikawa-gun, Toyama-ken; Akira Nakagawa, 32, Nakaaoide, Kamiichi-machi, Nakaniikawa-gun, Toyama-ken, both of Japan

[21] Appl. No.: 819,615

[22] Filed: Jan. 17, 1986

[30] Foreign Application Priority Data

Nov. 13, 1985 [JP] Japan .................... 60-255723

[51] Int. Cl.[4] .............................. F16L 33/23
[52] U.S. Cl. .................... 285/243; 285/347; 285/322; 285/255; 285/248
[58] Field of Search ............ 285/248, 249, 243, 322, 285/323, 331, 347, 149, 242, 251, 257, 255, 259, 903

[56] References Cited

U.S. PATENT DOCUMENTS

| 2,120,275 | 6/1938 | Cowles | 285/243 |
| 2,321,260 | 6/1943 | Stecker | 285/249 |
| 3,078,109 | 2/1963 | Jackson | 285/251 |
| 3,647,934 | 3/1972 | Hurtt | 285/248 |
| 3,791,680 | 2/1974 | Cleare | 285/251 |
| 3,836,700 | 10/1974 | Niemeyer | 285/248 |
| 4,162,092 | 7/1979 | Harps | 285/248 |
| 4,219,222 | 8/1980 | Brusadin | 285/248 |
| 4,366,011 | 12/1982 | Nolf | 285/417 |
| 4,394,787 | 7/1983 | Lieberman | 285/351 |
| 4,564,222 | 1/1986 | Loker et al. | 285/347 |
| 4,599,784 | 7/1986 | Canu, Jr. et al. | 285/251 |

FOREIGN PATENT DOCUMENTS 3133837 3/1983 Fed. Rep. of Germany ...... 285/248
879151 10/1961 United Kingdom ............ 285/248

Primary Examiner—Andrew V. Kundrat
Assistant Examiner—Eric K. Nicholson

[57] ABSTRACT

A hose coupler particularly suitable for spiral wire reinforced hoses having either one or both of their outside and inside surfaces embossed by the spiral reinforcement of metal or synthetic resin material provided either externally wound about the outside or internally imbedded between the two pliers along the entire hose length, is disclosed, which has a cylindrical sleeve for enclosing the engaged end of the hose about the nipple. This sleeve is itself encased within the back nut, when it is engaged with the main body. An annular projection is formed in the inside of the sleeve at its one end, which is provided to be pressed against the outside of the hose over a longitudinal range that is not less than the pitch of the reinforcement helix in the hose. A tubular seal is provided wound about the outside of the nipple at its forward end. The tubular seal is formed to have its longitudinal length to match the dimension of the contacted surface of the projection. Also, the tubular seal is situated in the nipple circumference at such a point that, when the back nut is engaged with the main body, with the hose end being pulled up into place over the nipple within the sleeve, the projection is pressed against the hose just over the seal. In this way, the hose is sealed all way round its circumference on both of the knaggy outside and inside.

8 Claims, 7 Drawing Figures

FIG. I
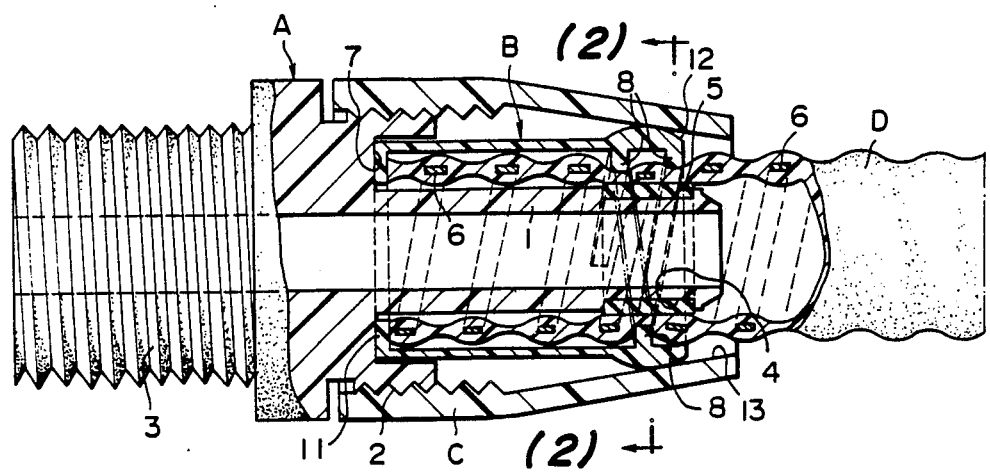
FIG. 2
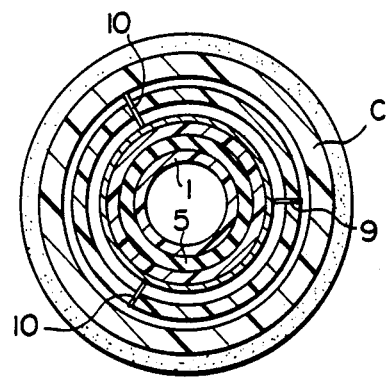

HOSE COUPLER FOR SPIRAL WIRE REINFORCED HOSES

BACKGROUND OF THE INVENTION

(1) Field of the Invention

The present invention relates to a hose coupling, and in particular to a hose coupling suitable for use with spiral wire reinforced hoses.

(2) Description of the Prior Art

A typical hose coupling in the prior art consists in the main of a nipple with a corrugated or barbed surface on its external circumference for gripping the inside of the hose end firmly, an axially movable back nut for clamping the hose end in place about the nipple, and a main body having in its circumference an external thread for engagement with the back nut through its internal thread portion. The main body has at its opposite end either an external or an internal thread portion for connection with another length of hose with a coupling having a mated thread end.

In such a conventional hose coupler the nipple takes firm grip on the inside of the hose end through its wrinkled circumference, providing a tight leakproof seal at the point of connection, and the back nut clamps the hose securely, preventing accidental disconnection or looseness during fluid transfer service.

Those prior art hose couplers have been widely accepted and efficiently used with general purpose and other hoses made of rubber or synthetic resin material with smooth or plain inside and outside surfaces.

In the recent years, however, general demands for enhanced performance such as greater flexibility and resistance to pressures and temperatures have brought about a popular use of spiral wire-reinforced hoses. The hose of this type reinforces its body structure with a flight or fliqhts of helical wire of metal or synthetic resin wound along the entire hose length, either externally about the covering or internally imbedded between the outer and inner pliers.

These reinforced hoses, owing to the very presence of the spiral wire reinforcement, are normally more or less knotty or wrinkled in either or, in some products, both of their outside and inside surfaces, along the length. As a result, the prior art hose couplers have been found to suffer several hitherto unknown difficulties when used on such a reinforced hose.

First, with a spiral wire-reinforced hose having its inside surface wrinkled, the nipple inserted into the hose end leaves air gaps between their contacted corrugated surfaces, through which the transferred fluid can readily leak. In addition, the corrugation both in their mated surfaces does not insure a firm grip between the hose and the nipple.

Secondly, when the hose is corrugated in the outside, some difficulty will be encountered, after inserting the nipple into the plain inside of the hose, in moving the back nut over the knotty hose outside for fit engagement with the nipple. An improper enqagement between the back nut and nipple can result in the hose easily coming off from the coupling.

In the case of a reinforced hose having both sides wrinkled, the aforesaid problems are doubled. Further, since it is somewhat difficult and awkward to bring the back nut over the corrugated outer surface of the hose in engagement with the nipple, the gripped hose end can most likely to stand clamped in a distorted state where the pressures exerted by the back nut on the hose outside cause the hose inside to contact with the nipple circumference in points at which the ridges of their surface corrugations. Consequently, the fluid can easily leak in drips or, in an extreme case, in spurts through openings defined between these contacted points in the mated surfaces.

With the above-mentioned problems in the background, great demand has been placed on the development of an improved hose coupling capable of efficient service on spiral wire-reinforced hoses with corrugated surfaces, without causing a leak or accidental disconnection during use.

It is therefore a main object of the present invention to provide an improved hose coupler particularly suitable for spiral wire-reinforced hoses having their inside and outside surfaces embossed by the helical reinforcement provided either wound about the covering or internally imbedded, which is capable of tight leakproof seal and firm grip, without causing an air gap in the engaged surfaces of the nipple wrinkled circumference and the hose knaggy outside.

The above and other objects, features and advantages of the present invention are accomplished by the structure of the hose coupling that, according to one preferred embodiment, features a tubular seal fixedly secured about the nipple circumference and formed to have its axial length to measure not less than the pitch of the reinforced wire helix in the hose. The hose coupling also includes a cylindrical sleeve adapted to enclose the engaged hose end and about the a nipple and having at its forward end an inwardly-extending projection formed in the inside thereof for gripping on the hose outside. The sleeve has at least a longitudinal slit cut in the wall thereof so that the sleeve can be both radially outwardly spread and inwardly compressed to permit insertion and engagement of the hose end therein.

The relative position of the projection in the sleeve to the seal in the nipple is designed that, when the engaged hose end about the nipple is encased in place within the sleeve, the projection engages the hose outside just over the seal. As a consequence, the hose is sealed to all way around the circumference on both of the corrugated inside and outside surfaces, insuring a tight leakproof seal.

The invention will be better understood by reference to the accompanying drawings, taken in conjunction with the following discussion.

BRIEF DESCRIPTION OF THE DRAWINGS

FIG. 1 is a partially sectional side view of a preferred embodiment of the hose coupling constructed in accordance with the present invention;

FIG. 2 is a cross-section view taken along the line (2)—(2) of FIG. 1;

DESCRIPTION OF THE PREFERRED EMBODIMENTS

Figure 3:
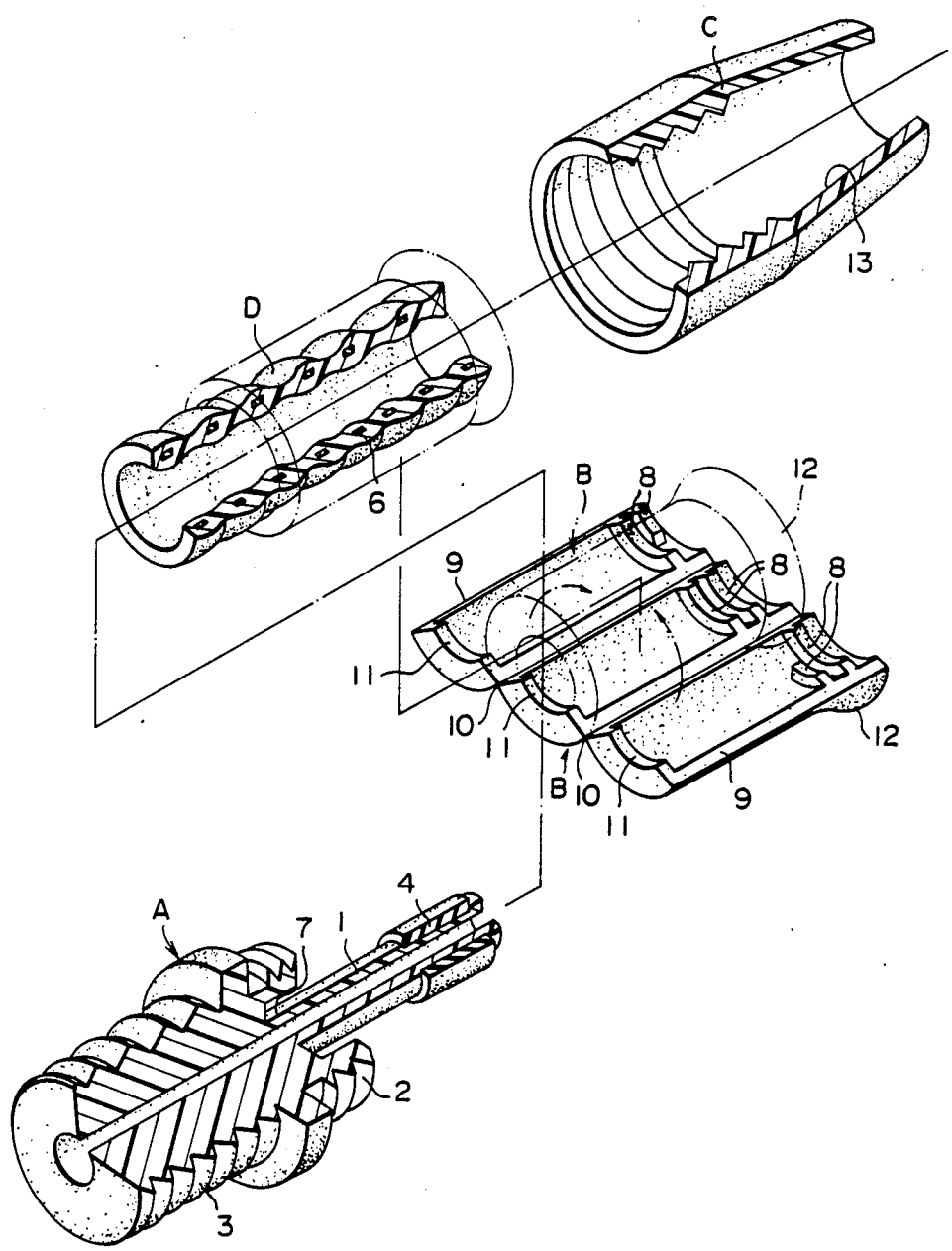
FIG. 3 is an exploded perspective view of the hose coupling shown in FIG. 1.

In FIG. 1 a preferred embodiment of the hose coupler designed according to this invention is shown when it is gripping the end of a spiral wire-reinforced hose D. The hose coupler includes main body A, a hollow cylindrical member or sleeve B. and a back nut C which is threadedalong part of its inside surface. The main body A has an elongate cylindrical nipple 1 axially made integral thereto at its one end. Formed integral with the opposite end of the main body A is an external thread portion 3 for connection to another length of hose through the mated internal thread portion of a similar hose coupler.

Although in this particular embodiment the threaded connection of the coupler is an external thread, as designated at 3, this is a matter of choice and it may well be an internal thread.

The nipple 1 has its outside circumference corrugated or barbed to enable it to grip on the inside of the hose end. At the base of the nipple 1 in the main body A, an external thread portion 2 is formed for engagement with the back nut C through its internal thread. Also, the nipple 1 has at its forward end an annular recess 4 formed all way about the circumference.

A tubular seal 5 is fixedly secured inside the annular recess 4. preferably, the seal 5 is made of a resilient material with a thickness substantially equal to the depth of the recess 4 so that the top surface thereof within the recess merges into the outside surface of the nipple 1.

Further, tubular seal 5 preferably is formed to a longitudinal length that is not less than the dimension of the pitch of the reinforcing wire helix 6 of the hose D. Further, the annular recess 4 is sized to an axial length that is fittingly filled by the size of the seal 5.

Adjacent to the base of the nipple 1 in the main body A is formed an annular groove 7 that runs surrounding the nipple. The groove 7 is provided to receive therein the rear end of the sleeve B full way to its depth locating the relative position of the sleeve B to the nipple 1.

The sleeve B is preferably made of a synthetic resin or metal material, and formed to an inside diameter that is slightly greater than the outside diameter of the hose D. At the other end of the sleeve B is formed an inwardly protruding spiral projection 8 that is made integral with the inside surface of the sleeve, as best shown in FIG. 3. The projection 8 engages about the hose outside over a range corresponding to the longitudinal length of the seal 4.

The sleeve B is formed to an longitudinal length that, when the sleeve B is inserted in place within the annular groove 7, the projection 8 is located at a point just overlying the top surface of the tubular seal 5 in the nipple 1. Thus, when the hose D is properly pulled in about the nipple 1 within the sleeve B, the projection 8 engages the hose at its outside, pressing it tightly against the seal 5 at its inside over a wide range enough to seal the hose full way around the circumference on both sides thereof.

In the wall of the sleeve B is cut a longitudinal slit 9 that runs part way in the wall starting from its forward end such that the sleeve 8 can be radially inwardly compressed to smaller diameters so as to take greater grip on the hose outside. The slit 9 may be cut all way through the sleeve wall. Further, in the inside surface of the sleeve B are formed a plurality of axial grooves 10 as best shown in FIG. 3, dovodong the sleeve B into multiple arcuate segments of a whole cylindrical shape. Thus, the sleeve B can be bend along these grooves 10 to radially spread or compress to permit insertion or engagement of the hose ens therein. Although, in this embodiment, the sleeve B has two such grooves 10, this is a matter of choice, and it may have as many grooves as desired.

A rib 11 is made integral with the inside surface of the sleeve B at its opposite end, which is provided to determine the location of the engaged hose end within the sleeve B, as best shown in FIG. 1.

At that end of the sleeve B having the projection 8 is provided a collar 12 that is made integral with the outside surface thereof. The back nut C is built to taper toward its non-threaded end. Thus, tightening the back nut C in the main body A brings the tapered inside wall of the back nut into abutting contact against the collar 12 causing the sleeve to compress radially inwardly, thereby pressing the projection 8 against the hose outside. Thus, the grip on the hose is increased.

The sleeve B with the longitudinal slit 9 may preferably be formed to an arcuate dimension that, when radially inwardly compressed by tightening the back nut C, brings the wall surface of the sleeve to completely closely enclose the engaged hose end about the nipple 1 pressing the hose inside against the surface of the seal 5.

Figure 4:
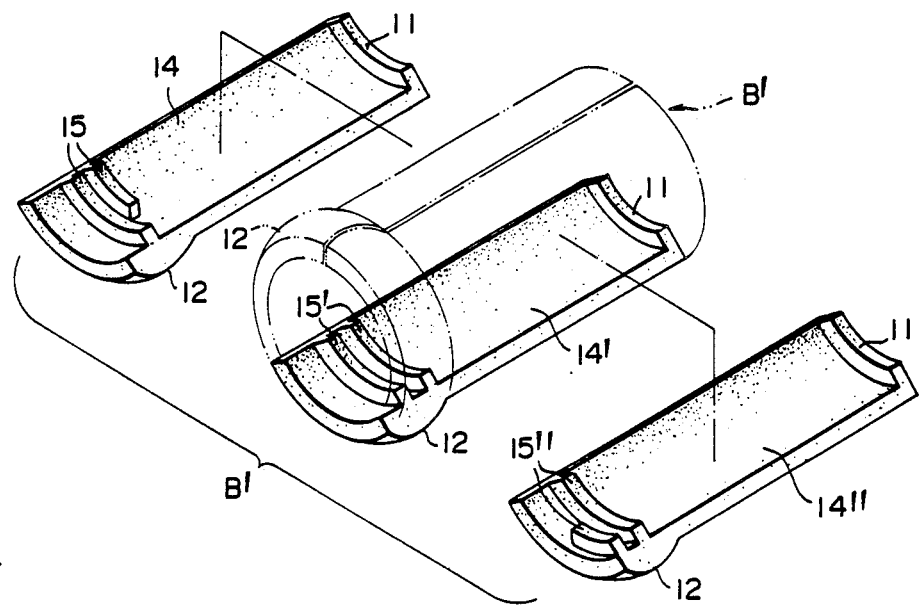
FIG. 4 is perspective view of a modified form of the sleeve illustrated in FIG. 1.

FIG. 4 shows a modified form of sleeve B' which is similar in general design to the sleeve B of the first embodiment, except for the following few features. First, the sleeve is divided into multiple arcuate segments 14, 14', 14" of a whole hollow cylinder. These segments 14, 14', 14" are sized to assemble into a complete cylindrical shape enclosing the end of the hose D completely tightly.

Also, plural spiral projections 15, 15', 15" supercede the projection 8 of the above embodiment, which is provided to serve the same effect as the projection 8. Thus, the pitch of tne helix in the projection 15 is sized to match the dimension of the axial length of the tubular seal 5.

Further, the radius of the individual arcuate segments 14, 14', 14" must be determined so that, when they are assembled edge-to-edge into a complete cylindrical shape of the whole sleeve B' about the hose D, they would immediately enclose the hose while causing its inside to be properly tightly pressed against the surface of the tubular seal 5.

Although, in this modification, the sleeve B' is split into three arcuate segments 14, 14', 14", this is only a matter of choice, and the sleeve B' may be composed of as many arcuate segments 14, 14', 14" as desired.

Figure 5:
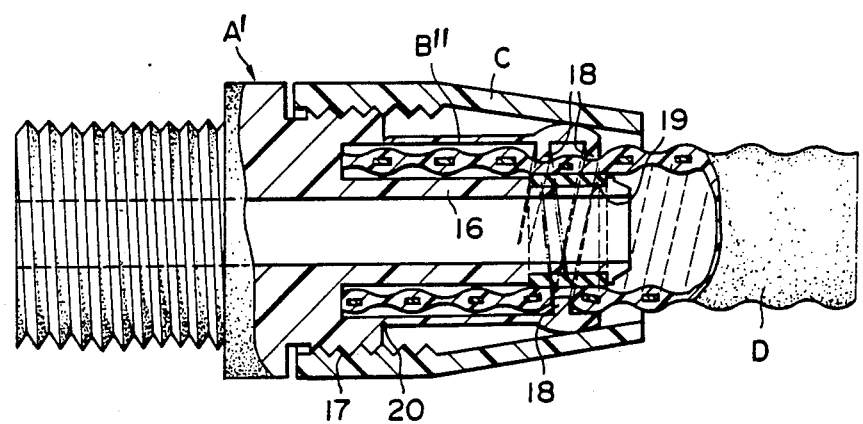
FIG. 5 is a partially sectional side view of a second embodiment of the present invention in which the sleeve is made integral with the main body.
Figure 6:
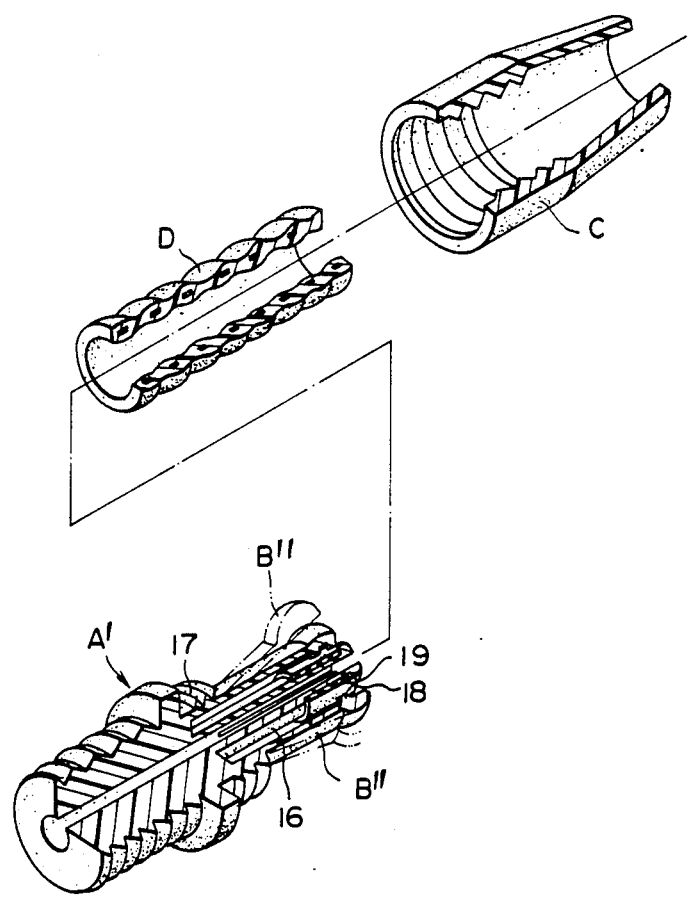
FIG. 6 is an exploded perspective view of the hose coupling shown in FIG. 5, with the parts being removed to show the structure more clearly.

A second preferred embodiment of the present invention is shown in FIG. 5, in which the sleeve B" is made integral with the main body A' adjacent to the base of the nipple 16. The sleeve B" extends axially concentrically enclosing a rear portion of the nipple 16 in a somewhat loose manner.

Further, a plurality of longitudinal slits are formed in the wall of the sleeve B" through its length dividing the sleeve into multiple arcuate segments. In addition, an annular groove 20 is formed in the outside surface of the sleeve B" at a point where the sleeve is affixed to the main body A". The groove 20 is provided such that the sleeve can easily allow its split segments to bend radially outwardly at their base so as to admit readily insertion of the hose D into place within the sleeve B". Also, the sleeve B" has at its forwardmost end in the outside surface a collar substantially similar in design and size to the collar 12 in the previous embodiment.

Additionally, the coupler of this embodiment has an external thread portion 17 in the main body A', a tubular seal 19 fitted within the recess of the nipple and a spiral projection 18 which are substantially similar in design and construction to the external thread portion 2, the tubular seal 5, and the axial projection 15 in the previous embodiment.

Figure 7:
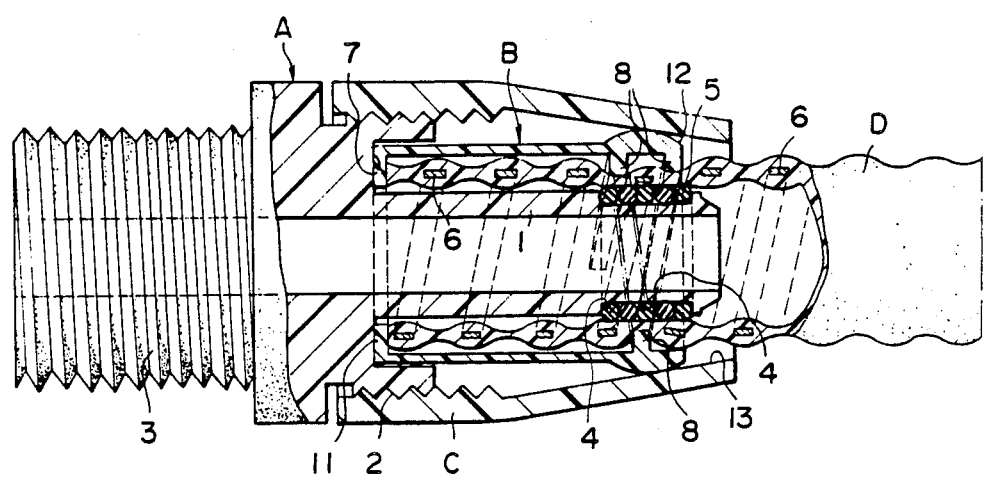

Although in either of the foreqoinq embodiments the tubular seal 5, 9 is in structure a one-piece hollow cylinder, it may be made of plural rings of sealing material such as O-rings as shown in FIG. 7. Further, in either preferred embodiment, the relative position of the projection 8, 18 in the inside of the sleeve is determined such that, when the sleeve is fitted about the nipple 16, the projection stays just over the surface of the tubular seal 5, 19.

Connecting a hose D with and assembling the hose coupler of this invention will be described. First, the back nut C is disengaged from the main body A, A' and pulled up onto the hose D. Then, the hose D is pushed into engagement about the nipple 16 within the sleeve B, B', B" until the hose is abutted at its end against the rib 11 in the sleeve. After making sure that the hose is inserted in position, with the hose end being properly completely enclosed by the sleeve, the back nut C is pulled back into engagement into the external thread portion 2, 17 of the main body. This engagement brings the tapered inside surface 13 of the back nut C into pressure contact against the raised collar 12 of the sleeve, which causes in turn the sleeve to be compressed inwardly at its forward end. As a result, the projection 8, 15, 18 comes to be pressed against the hose outside causing it to be pressed at its inside against the surface of the seal 5, 19. Because of the sizes of both the tubular seal 5, 10 and the projection 8, 15, 18, the hose comes to be gripped all way around its outside circumference so that a tigh leakproof seal is obtained.

Although the present invention has been described as a hose coupler which may be connected to another length of hose through a similar hose coupler, it can be incorporated into devices for fluid supply, transport or distribution whose connections requires the firm grip in tight leakproof seal of a spiral wire-reinforced hose. For example, this invention can be embodied as the hose connector of a shower head or a spray gun.

Although the present invention has been shown and described with respect to detailed illustrative embodiments thereof, it should be understood by those skilled in the art that various modifications and combinations of parts may be made without departing the spirit and the scope of the invention.

What is claimed is:

1. A hose coupling for attachment to the end portion of a hose which contains a reinforcing wire that is spirally wrapped along the length thereof and provides an undulating surface to at least one of the inside and outside surfaces of said hose, said hose coupling comprising an elongated main body element which has opposite first and second ends, said first end including a connector portion which is threaded so that it can be attached to another hose coupling, and said second end including an axially-extending nipple portion which is insertable in the end portion of said hose, a seal means provided around the outer surface of said nipple portion, said seal means extending in the axial direction of said elongated main body element a distance at least equal to the pitch of one revolution of said spirally-wrapped reinforcing wire of said hose, a cylindrical sleeve which is positionable over the end portion of said hose when the end portion of said hose is positioned around said nipple portion of said elongated main body element, said cylindrical sleeve having a forward end which extends towards the connector portion of said elongated body element, a rearward end which extends away from the connector portion of said elongated body element, an outer surface and an inner surface, said inner surface providing a helical projection which extends radially inwardly of said cylindrical sleeve and is located along the length thereof to project towards said seal means, and a back nut which is positionable over said cylindrical sleeve and includes a leading end which is connectable with said elongated main body element, a trailing end, an outer surface, and an inner surface, said inner surface tapering towards said trailing end such that, when said leading end is connected to said elongated main body element, said inner surface thereof will contact the rearward end of said cylindrical sleeve and move the helical projection on the inner surface of said cylindrical sleeve towards said seal means located around the outer surface of the nozzle portion of said elongated main body element, thus securely clamping the end portion of said hose positioned between the nozzle portion and the cylindrical sleeve.

2. A hose coupling as set forth in claim 1, wherein said seal means is a seal member of hollow cylindrical shape.

3. A hose coupling as set forth in claim 1, wherein said seal means is composed of a plurality of O-rings axially arranged into a cylindrical shape.

4. A hose coupling as set forth in claim 1, wherein said cylindrical sleeve has a longitudinal slit cut all way through the entire wall length thereof.

5. A hose coupling as set forth in claim 1, wherein the inner surface of said cylindrical sleeve includes at least one longitudinal groove such that said cylindrical sleeve can be bent along each said groove to spread radially outwardly.

6. A hose coupling as set forth in claim 1, wherein said cylindrical sleeve is composed of multiple arcuate segments of a whole hollow cylinder.

7. A hose coupling as set forth in claim 1, wherein the forward end of said cylindrical sleeve is made integral with said main body.

8. A hose coupling as set forth in claim 1, wherein said cylindrical sleeve includes a projection at its rearward end that extends outwardly from the outer surface thereof for abutting contact with the inner surface of the back nut near the trailing end thereof.

* * * * *

UNITED STATES PATENT AND TRADEMARK OFFICE
CERTIFICATE OF CORRECTION

PATENT NO. : 4,705,304

DATED : November 10, 1987

INVENTOR(S) : Tatsuya Matsuda et al.

It is certified that error appears in the above-identified patent and that said Letters Patent is hereby corrected as shown below:

Column 2, after line 68 insert:

--FIG. 7 is a partially sectional side view of a modified form of the seal.--

Signed and Sealed this

Twenty-ninth Day of March, 1988

Attest:

DONALD J. QUIGG

*Attesting Officer*   *Commissioner of Patents and Trademarks*